United States Patent Office 3,013,038
Patented Dec. 12, 1961

3,013,038
CONVERSION OF ACIDS TO ALCOHOLS HAVING ONE LESS CARBON ATOM AND ESTERS THEREOF
Edgar A. Blair, Drexel Hill, and John J. Melchiore, Wallingford, Pa., assignors to Sun Oil Company, Philadelphia, Pa., a corporation of New Jersey
No Drawing. Filed Dec. 17, 1959, Ser. No. 860,074
3 Claims. (Cl. 260—410.9)

The present invention provides a novel manner of obtaining from carboxylic acids, an alcohol having one less carbon atom than the original acid. This permits syntheses which were not possible, by any simple procedure, in the prior art. Thus, for example, the present process enables various oxygen-containing compounds to be obtained from compounds having one more carbon atom, as a desirable or superior alternative to known processes for obtaining such compounds from compounds having the same number of carbon atoms.

The process of the present invention involves contacting a liquid reaction mixture consisting essentially of a carboxylic acid, having dissolved therein a cobalt salt of a fatty acid, with gaseous oxygen at a temperature of at least 100° C. This contacting results in the conversion of the carboxylic acid partly to a corresponding alcohol having one less carbon atom and partly to an ester of such alcohol with the original carboxylic acid. The esters in the product can if desired be hydrolyzed to form the alcohol and the acid.

The starting material for the process is an acid having the formula $RCH_2COOH$ where R is an aliphatic hydrocarbon radical having 1 to 25 carbon atoms. Examples of suitable acids are propionic, butyric, caprylic, and stearic acid; other acids of the well-known fatty acid series can also be employed. The alcohol and ester reaction products which are obtained have the formulas $RCH_2OH$ and $RCH_2OOCCH_2R$ respectively.

The obtaining of an alcohol and its ester in a process involving the subjection of a carboxylic acid to conditions which are normally thought of as being oxidation conditions is believed to be a surprising result. The mechanism of the reaction is not known, but it may be that a peroxide is initially formed and subsequently decomposed in such manner as to remove the carboxyl group. However, the invention is not to be limited to any specific theory with respect to mechanism of the reaction.

The reaction mixture consists essentially of acyclic material including the carboxylic acid having a cobalt salt dissolved therein. It is within the scope of the invention for other constituents to be present in the reaction mixture, which are not themselves reacted as a result of the contacting and which do not otherwise change the basic character of the process. An inert solvent for the carboxylic acid can be employed if desired but is usually unnecessary.

The cobalt salt which is employed is a compound of the class which is generally known to be suitable for use as catalyst in the liquid phase partial oxidation of hydrocarbons. The salts employed are not limited to salts of the lower molecular weight members of the fatty acid series. Generally any fatty acid which forms a cobalt salt which is soluble in the reaction mixture can be employed. The lower fatty acids such as acetic acid and propionic acid are preferred since they provide a higher metal content in the reaction mixture at a given concentration of the cobalt salt. In one embodiment the cobalt salt is a salt of the same fatty acid which is the starting material for conversion to the next lower alcohol, and the salt may be formed in situ by reaction of a small portion of the fatty acid starting material.

Preferably the amount of cobalt salt which is employed is within the approximate range from 1 to 20 weight percent, calculated as cobaltous acetate tetrahydrate based on the carboxylic acid starting material, though other amounts can be used in some instances. More preferably the amount of cobalt salt is at least 5 weight percent.

The cobalt salt which is employed as catalyst in the process should contain cobaltic ion. In one embodiment the catalyst is initially in the cobaltous state and is converted to the cobaltic state, at least partially, as a result of the contact with oxygen. Any suitable activating material capable of promoting such conversion can be employed in the reaction mixture. Bromine-containing activators such as ammonium bromide; ketone activators such as methyl ethyl ketone; and aldehyde activators such as acetaldehyde are examples of suitable activators.

Gaseous oxygen is supplied to the reaction mixture in any suitable form. Preferably, substantially pure oxygen is employed but it is within the scope of the invention to employ air or other mixtures of oxygen and inert gas. Ozonized air or oxygen can be employed if desired.

The amount of oxygen which is employed in the process is preferably in the approximate range from 50 to 500 ml. at standard conditions per minute per 100 grams of carboxylic acid starting material. However other amounts can be used in some cases.

The temperature of the contacting according to the invention is at least 100° C. and preferably in the range from 100 to 160° C., though higher temperatures can be used in some instances. A pressure is employed which is sufficient to maintain the carboxylic acid starting material in liquid state. Usually atmospheric pressure is sufficient but elevated pressure is employed if necessary.

The following examples illustrate the invention:

Propionic acid is converted to ethyl propionate by contact with oxygen under the conditions of the present invention. The contacting involves blowing oxygen at a rate of 150 ml. per minute through a solution of 5 grams of cobaltous acetate tetrahydrate in 100 ml. of propionic acid at the reflux temperature of the propionic acid. The temperature is 142° C. at the beginning and drops gradually to 114° C. after 4 hours. The reaction mixture is purple at the beginning, but turns green as the reaction proceeds, indicating the conversion of cobaltous ion to cobaltic ion.

After 6 hours the reaction mixture is found to contain 2.5% ethyl propionate and 0.5% ethanol. These two reaction products are separated from the reaction mixture by distillation and unreacted propionic acid is re-cycled for further conversion to these products. If desired the ethyl propionate is hydrolyzed according to known procedures to obtain ethyl alcohol and propionic acid, the latter being re-cycled to the reaction zone.

Generally similar results are obtained employing other carboxylic acids such as those specifically disclosed previously as starting material. In each case the starting material is converted to the corresponding alcohol containing one less carbon atom and to an ester of that alcohol with the original carboxylic acid.

In its general aspect the process of the invention involves obtaining an oxygen-containing compound from a starting material which has one more carbon atom in the molecule. For example, enanthic acid can be converted to n-hexanol by the process of the invention. The enanthic acid may itself be prepared from other seven carbon atom alkyl compounds, e.g. hydrocarbon, alcohol, or aldehyde, by known procedure, and the n-hexyl alcohol may in turn be converted by known procedure to other six carbon atom oxygen-containing compounds, e.g. aldehyde or carboxylic acid. Depending on the economic factors involved, such procedures provide, at various carbon atom levels, desirable alternatives to known procedures for proceeding for example from one six-carbon-atom compound to another. Furthermore, the degradation in carbon atom number can be performed stepwise, to obtain a desired oxygen-containing compound from a compound having two more carbon atoms, three more carbon atoms, etc. For example, the six-carbon-atom alcohol can be obtained from the seven-carbon-atom acid, and then oxidized to the six-carbon-atom acid, which is converted to the five-carbon-atom alcohol and so forth.

The invention also permits the economical attaining of higher molecular weight compounds such as alcohols, aldehydes and acids having odd numbers of carbon atoms, e.g. in the range from 11 to 19 carbon atoms, from the naturally occurring fatty acids having even numbers of carbon atoms in the molecule. Thus for example, stearic acid can be converted, by the contacting according to the invention to the corresponding alcohol containing 17 carbon atoms. Ordinary reduction, on the other hand, produces octadecanol, having 18 carbon atoms from stearic acid.

The invention claimed is:

1. Process for preparing aliphatic alcohols and esters thereof which comprises: contacting a liquid reaction mixture consisting essentially of an acid having the formula $RCH_2COOH$ where R is a saturated aliphatic hydrocarbon radical having 1 to 25 carbon atoms, having dissolved therein a cobalt salt of a fatty acid, with gaseous oxygen at a temperature of at least 100° C. and at a pressure sufficient to maintain the acid in liquid state, thereby to convert the acid partly to an alcohol having the formula $RCH_2OH$ and partly to an ester having the formula $RCH_2OOCCH_2R$.

2. Process according to claim 1 wherein said acid is propionic acid.

3. Process according to claim 1 wherein said acid contains 12 to 20 carbon atoms per molecule.

References Cited in the file of this patent

UNITED STATES PATENTS 2,814,641     Phillips et al.     Nov. 26, 1957

OTHER REFERENCES

"Beilstein's Hanbuch de Organischen Chemie," fourth ed. The first supplement to the 2nd volume, page 105 (1929).